(12) United States Patent
Chorna et al.

(10) Patent No.: US 7,711,632 B2
(45) Date of Patent: May 4, 2010

(54) SYSTEMS AND METHODS FOR IMPLEMENTING THE STRUCTURING, PRICING, QUOTATION, AND TRADING OF FINANCIAL INSTRUMENTS

(75) Inventors: Douglas T. Chorna, Delray Beach, FL (US); Srikanth Sankaran, Winnetka, IL (US)

(73) Assignees: SRI, Inc., Northfield, IL (US); Cayuga Derivatives, Inc., Delray Beach, FL (US)

( * ) Notice: Subject to any disclaimer, the term of this patent is extended or adjusted under 35 U.S.C. 154(b) by 870 days.

(21) Appl. No.: 11/353,977

(22) Filed: Feb. 15, 2006

(65) Prior Publication Data

US 2006/0265301 A1 Nov. 23, 2006

Related U.S. Application Data

(60) Provisional application No. 60/653,104, filed on Feb. 16, 2005.

(51) Int. Cl.
*G06Q 40/00* (2006.01)
(52) U.S. Cl. .......................................... 705/37; 705/38
(58) Field of Classification Search .............. 705/37–38
See application file for complete search history.

(56) References Cited

U.S. PATENT DOCUMENTS

| 4,774,663 | A | 9/1988 | Musmanno et al. |
|---|---|---|---|
| 5,644,727 | A | 7/1997 | Atkins |
| 5,708,780 | A | 1/1998 | Levergood et al. |
| 5,715,314 | A | 2/1998 | Payne et al. |
| 5,724,424 | A | 3/1998 | Gifford |
| 5,765,143 | A | 6/1998 | Sheldon et al. |
| 5,774,870 | A | 6/1998 | Storey |
| 5,794,207 | A | 8/1998 | Walker et al. |
| 5,794,210 | A | 8/1998 | Goldhaber et al. |
| 5,950,177 | A | 9/1999 | Lupien et al. |
| 6,101,484 | A | 8/2000 | Halbert et al. |
| 6,167,386 | A | 12/2000 | Brown |
| 6,202,051 | B1 | 3/2001 | Woolston |
| 6,233,566 | B1 * | 5/2001 | Levine et al. ............. 705/36 R |
| 6,236,972 | B1 | 5/2001 | Shkedy |

(Continued)

OTHER PUBLICATIONS

CME, "TRAKRS—Total Return Asset Contracts", Copyright © 2004 Chicago Mercantile Exchange Inc.

(Continued)

*Primary Examiner*—Thu Thao Havan
(74) *Attorney, Agent, or Firm*—Barnes & Thornburg LLP (57) ABSTRACT

An exchange-traded financial instrument having a price that tracks an underlying benchmark, the underlying benchmark being a security or commodity that is itself traded. A contract for the financial instrument between a buyer and seller is not contingent upon the delivery of the underlying benchmark. A net carrying charge (credit or debit), defined as the difference between the investment yield of the underlying benchmark and a cost of financing ownership of the underlying benchmark using the generally accepted industry standard financing rate for that benchmark, is credited or debited, accrued, or built into the price of the derivative for both buyer and seller of the financial instrument, typically nightly. In one embodiment, the underlying benchmark is a U.S. Treasury security, and preferably a specific U.S. Treasury security such as the on the run (OTR) 10 Year Treasury note. Other single contract spread and ratio instruments are also disclosed.

29 Claims, 3 Drawing Sheets

U.S. PATENT DOCUMENTS

| | | | |
|---|---|---|---|
| 6,260,024 | B1 | 7/2001 | Shkedy |
| 6,266,652 | B1 | 7/2001 | Godin et al. |
| 6,269,343 | B1 | 7/2001 | Pallakoff |
| 6,341,271 | B1 | 1/2002 | Salvo et al. |
| 6,366,890 | B1 | 4/2002 | Usrey |
| 6,470,324 | B1 | 10/2002 | Brown et al. |
| 6,598,026 | B1 | 7/2003 | Ojha et al. |
| 6,629,082 | B1 | 9/2003 | Hambrecht et al. |
| 6,765,143 | B2 | 7/2004 | Kiely |
| 2005/0154660 | A1 | 7/2005 | Sturm et al. |

OTHER PUBLICATIONS

Parks, "The ABC of CMOs, REMICs, and IO/POs: Rocket Science Comes to Mortgage Finance", Journal of Accountancy, v171n4, pp. 41-51, Apr. 1991.

Holdcroft et al. "The Wizards of Wall Street", Secondary Mortgage Markets, v5n4, pp. 16-20, Winter 1988/1989.

"An Investor's Guide to Collateralized Mortgage Obligations (CMOs)", The Bond Market Association, 1999.

"An Inventor's Guide to Pass-Through and Collateralized Mortgage Securities", The Bond Market Association, 1997.

Hu, "Secondary Market: The American Model", Mortgage Banking, v51n7, pp. 14-23, Apr. 1991.

Esaki, "Testing the Foundation", Mortgage Banking, v51n7, pp. 8-12, Apr. 1991.

Kelley, "CMOs Offer Higher Returns, Greater Risks", Pacific Banker, v85n7, pp. 10, Apr. 1988.

Blush, "Different Players Give the Market a New look", Savings Institutions, v11n10, pp. 18-23, Oct. 1991.

Forsyth, "Tranche Warfare: In CMOs, It's the Institutions vs. Individual Investors", Barron's v71n33, pp. 12-13, Aug. 1991.

Angell, "Evaluating Investments in CMOs", Real Estate Review, v21n2, pp. 41-48, Summer 1991.

Battles, "Multi-Class Securities: An Integrated Policy for Thrifts", Real Estate Finance, v5n3, pp. 21-27, Fall 1988.

Gooch, "CMOs and REMICs: A New Twist on Traditional Mortgage-Backed Securities", Credit Union Manegement, v11n5, pp. 16-17, 31, May 1988.

Hu, "Derivative Securities Help Protect Mortgage Investments", Savings Institutions v109n3, pp. 80-87m Mar. 1988.

Wertz, "Collateralized Mortgage Obligations", CPA Journal, v57n11, pp. 68-71, Nov. 1987.

Woolley, "CMOs: Are The Solid Years Worth The Uncertainties?", Business Week, No. 3262, pp. 114, Apr. 1992.

Bisker, "Investing By-Numbers", Credit Union Management, v15n3, pp. 36-37, Mar. 1992.

State Street Bank & Trust Co., *Plaintiff-Appellee*, v. *Signature Financial Group, Inc.*, Defendant-Appellant. No. 96-1327. United States Court of Appeals, Federal Circuit. Jul. 23, 1998.

New York Mercantile Exchange trades products with a price differential of the benchmark for energy products, such as crude oil.

Information Disclosure Statement filed in U.S. Appl. No. 09/501,154.

"Prepackaged Yield Curve Trades" by Margaret Elliott (3 pages) found at http://www.derivativesstrategy.com/magazine/archive/1995-1996/0996exchf753.asp?print.

\* cited by examiner

*FIG. 1*

Examples of SPOTS based on On The Run U.S. Treasury Securities

| Settlement: CASH | 3 Month Treasury Bill | 6 Month Treasury Bill | 2 Year Treasury Note | 3 Year Treasury Note | 5 Year Treasury Note | 10 Year Treasury Note | 30 Year Treasury Bond |
|---|---|---|---|---|---|---|---|
| Symbol | | | | | | | |
| Contract Size | $1 Million | $1 Million | $200,000 | $200,000 | $100,000 | $100,000 | $100,000 |
| Quotations | 100 minus Discount Rate | 100 minus Discount Rate | Percent of Par | Percent of Par | Percent of Par | Percent of Par | Percent of Par |
| Minimum Price Change | $6.25 | $6.25 | $5.00 | $5.00 | $5.00 | $5.00 | $5.00 |
| Contract Cycle | Daily, Weekly, Monthly, Quarterly, T-Bill Maturity | Daily, Weekly, Monthly, Quarterly, T-Bill Maturity | Daily, Weekly, Monthly, Quarterly, Annual, T-Note Maturity | Daily, Weekly, Monthly, Quarterly, Annual, T-Note Maturity | Daily, Weekly, Monthly Quarterly, Annual, T-Note Maturity | Daily, Weekly, Monthly, Quarterly, Annual, T-Note Maturity | Daily, Weekly, Monthly, Quarterly, Annual, T-Bond Maturity |
| Last Trading Day | Last Business Day of Contract Cycle | Last Business Day of Contract Cycle | Last Business Day of Contract Cycle | Last Business Day of Contract Cycle | Last Business Day of Contract Cycle | Last Business Day of Contract Cycle | Last Business Day of Contract Cycle |
| Daily Settlement Price | 100 minus Market Discount Rate on 3 Month Treasury Bill times 2500 plus accrued interest minus accrued financing cost | 100 minus Market Discount Rate on 6 month Treasury Bill times 5000 plus accrued interest minus accrued financing cost | Market Price of two-year note plus accrued interest minus accrued financing cost | Market Price of three-year note plus accrued interest minus accrued financing cost | Market Price of five-year note plus accrued interest minus accrued financing cost | Market Price of ten-year note plus accrued interest minus accrued financing cost | Market Price of thirty-year bond plus accrued interest minus accrued financing cost |
| Final Settlement Price | 100 minus Market Discount Rate on 3 Month Treasury Bill times 2500 | 100 minus Market Discount Rate on 6 month Treasury Bill times 5000 | Market price of two-year note | Market price of three-year note | Market price of five-year note | Market price of ten-year note | Market price of thirty-year bond |

FIG. 2

Examples of Options on SPOTS based on On The Run U.S. Treasury Securities

| Settlement: CASH Style: American or European | 3 Month Treasury Bill | 6 Month Treasury Bill | 2 Year Treasury Note | 3 Year Treasury Note | 5 Year Treasury Note | 10 Year Treasury Note | 30 Year Treasury Bond |
|---|---|---|---|---|---|---|---|
| Symbol | | | | | | | |
| Contract Size | $1 Million | $1 Million | $200,000 | $200,000 | $100,000 | $100,000 | $100,000 |
| Quotations | 100 – Discount Rate | 100 – Discount Rate | Percent of Par | Percent of Par | Percent of Par | Percent of Par | Percent of Par |
| Minimum Price Change | $6.25 | $6.25 | $5.00 | $5.00 | $5.00 | $5.00 | $5.00 |
| Contract Cycle | Daily, Weekly, Monthly, Quarterly, T-Bill Maturity | Daily, Weekly, Monthly, Quarterly, T-Bill Maturity | Daily, Weekly, Monthly, Quarterly, Annual, T-Note Maturity | Daily, Weekly, Monthly, Quarterly, Annual, T-Note Maturity | Daily, Weekly, Monthly, Quarterly, Annual, T-Note Maturity | Daily, Weekly, Monthly, Quarterly, Annual, T-Note Maturity | Daily, Weekly, Monthly, Quarterly, Annual, T-Bond Maturity |
| Last Trading Day | Same as expiration of Underlying SPOT | Same as expiration of Underlying SPOT | Same as expiration of Underlying SPOT | Same as expiration of Underlying SPOT | Same as expiration of Underlying SPOT | Same as expiration of Underlying SPOT | Same as to expiration of Underlying SPOT |
| Daily Settlement Price | Market price | Market price | Market price | Market price | Market price | Market price | Market price |
| Final Settlement Price | Dollar Amount In the Money | Dollar Amount In the Money | Dollar Amount In the Money | Dollar Amount In the Money | Dollar Amount In the Money | Dollar Amount In the Money | Dollar Amount In the Money |

*FIG. 3*

SYSTEMS AND METHODS FOR IMPLEMENTING THE STRUCTURING, PRICING, QUOTATION, AND TRADING OF FINANCIAL INSTRUMENTS

This application claims the benefit of U.S. Provisional application No. 60/653,104, filed Feb. 16, 2005.

FIELD OF THE INVENTION

The present invention relates generally to financial instruments. More particularly, the present invention relates to SPOT synthetic ("SPOTS") financial instruments, SPREAD financial instruments ("SPRINTS"), SPRINTS based on SPOTS, ratio derivatives ("RADS"), RADS based on SPOTS, and options based on these instruments.

BACKGROUND

Financial markets are continually evolving and investors continually seek improved vehicles via which they can generate increased income or obtain better return on capital. Investors also generally desire the availability of a diverse "menu" of vehicles via which money may be invested. It is generally within this context that embodiments of the present invention were developed.

SUMMARY OF THE INVENTION

Embodiments of the present invention provide several new and unique financial instruments that may be freely traded on securities and commodities exchanges, alternative trading systems (ATS), electronic communication networks (ECN), and over the counter (OTC).

The first is a spot synthetic ("SPOTS"). A SPOTS is a synthetic financial instrument that is based on an underlying benchmark. A SPOTS assumes that the underlying benchmark is purchased and financed at the generally accepted industry standard financing rate for that instrument. If a SPOTS is bought and sold on the same day, the total profit/loss to the trader or investor is the differential between the purchase price and the sale price. If a SPOTS position is held overnight, the accounts of long and short position holders are credited or debited the net interest income or expense (a net carrying charge) associated with holding the equivalent position in the cash market. The net carrying charge is defined as the investment yield of the underlying instrument, less the cost of financing ownership of that instrument using the generally accepted industry standard financing rate for that specific instrument, for a particular time period (e.g., overnight, 3 months, or some other time period).

It is also possible to structure and trade options based on SPOTS.

Another financial related financial instrument in accordance with the present invention is a spread instrument (or "SPRINT"). SPRINTs are single class instruments that are composed of a differential (price, cash flow, or total return) between/among any two or more instruments (SPOTS, SPRINTs, RADs (discussed below), securities, commodities, derivatives, etc.). Unlike conventional techniques in taking a spread position, a SPRINT does not require the purchase and short sale of the underlying instruments. Instead, investors can purchase a single SPRINT contracts that is based on two or more instruments (typically a long and short position) already being traded in the open market. Such a technique avoids the so-called "short squeeze" situation that some investors experience when attempting to take the conventional approach to spread positions, namely buying one instrument and shorting another.

Still another instrument provided by the present invention is a ratio derivative (or RAD). RADs are financial instruments whose price is calculated by dividing the price, for example, of any benchmark instrument or group of benchmark instruments by, e.g., the price of another instrument, which results in a ratio. A RAD contract may be traded similarly to a SPRINT contract.

Another instrument described herein includes a SPOTS Swap in which the long contract holder and/or short contract holder has the option of settling the contract via cash settlement or via delivering or receiving delivery of the benchmark cash instrument.

Yet another instrument provided by the present invention is a SPRINT Yield in which the spread is based on the yields (not necessarily price) of the two instruments.

An interesting variant to the financial instruments described herein is the possibility of applying a contingency to the contract. Specifically, in a SPRINT contract for example, one of the underlying benchmarks could be changed upon the occurrence of a predetermined condition (e.g., a particular Blue Chip company bond defaults) such that at the initiation of the contract the spread was being calculated between benchmark X and benchmark Y, but if a condition is thereafter met, the spread would thereafter be calculated between benchmark X and benchmark Z. Similar contingencies can be applied to any of the financial instruments described herein.

Each of the foregoing financial instruments may be traded on commodity and securities exchanges, ATS, ECN, or OTC.

These and other features of the present invention, along with their attendant advantages, will be more fully appreciated upon a reading of the following detailed description in conjunction with the associated drawings.

BRIEF DESCRIPTION OF THE DRAWINGS

FIG. 2 is a table listing several examples of SPOTS based on "On The Run" U.S. Treasury Securities.

FIG. 3 is a table listing several examples of options on SPOTS based on "On The Run" U.S. Treasury Securities.

DETAILED DESCRIPTION

Structures. Embodiments of the present invention provide financial instrument structures for, among others, SPOTS, SPRINTs, SPOTS based on SPRINTs, RADs, and RADs based on SPOTS and options based on these instruments.

Pricing and Quotation. Embodiments of the present invention may also provide prices for SPOTS, SPRINTs, SPOTS based on SPRINTs, RADs, and RADs based on SPOTS and options based on these instruments. It is contemplated that such price data, by itself, may be of significant value, and may be disseminated as, e.g., price quotations, via electronic, Internet, or computer networks, or other means.

Trading. The trading of SPOTS, SPRINTs, SPOTS based on SPRINTs, RADs, and RADs based on SPOTS, and related options can be facilitated through various commodities exchanges, securities exchanges, electronic communications networks, alternative trading systems, "over the counter," and via other methods. The acts of trading the financial instruments described herein and in the manner described herein, and using the methodology described herein, are also considered valuable, independent of the instruments themselves.

Figure 1:
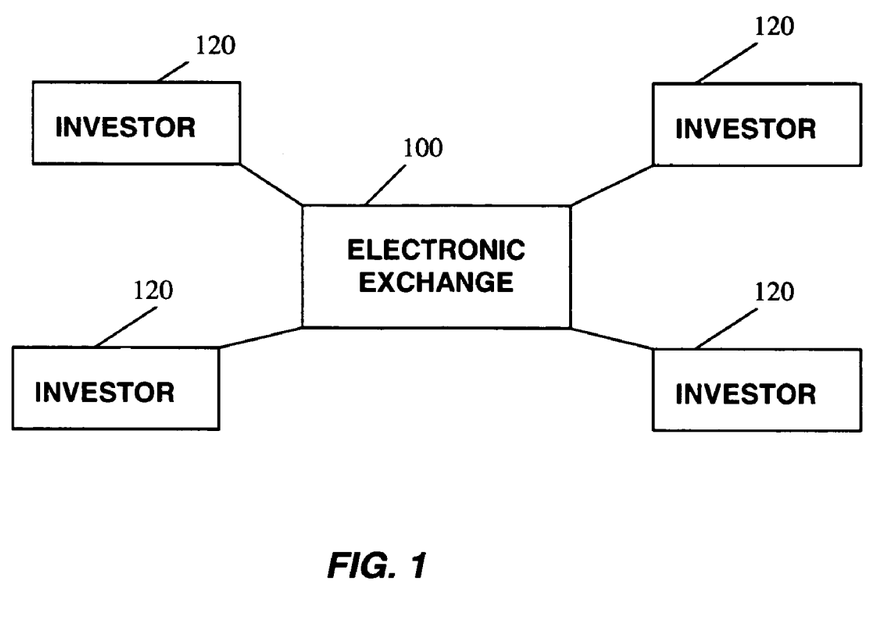
FIG. 1 depicts a typical network topology for implementing the embodiments of the present invention.

FIG. 1 depicts a typical network topology for implementing the embodiments of the present invention. An electronic exchange 100 is at the heart of the topology and is responsible for listing one or more of the several types of financial instruments described herein, and for disseminating price and quotation information substantially in real time. Investors 120 connect to electronic exchange 100 using well-known means such as the Internet, private networks, virtual private networks, and the like. The manner in which investors 120 connect to electronic exchange 100 is not critical to the invention. The instruments can also be traded by non electronic methods (e.g., open outcry or over the phone).

SPOT Synthetic (SPOTS)

A SPOTS is a type of derivative financial instrument. More specifically, a SPOTS is a synthetic financial instrument, based on virtually any underlying benchmark security (including Exchange-Traded Funds (ETFs)), commodity, currency, derivative, index, or other tradable or saleable item. A SPOTS is structured so that its price should exactly track the price, yield, and total return of the benchmark. A SPOTS assumes the underlying benchmark is purchased and financed at the generally accepted industry standard financing rate for that instrument. However, unlike cash securities or commodities, delivery or financing arrangements are typically not required for a SPOTS by market participants (although a SPOTS can be structured to include delivery of the underlying benchmark). A SPOTS can also, itself, be used as the benchmark for structuring and trading futures, forwards, options, spread instruments (for example, spread futures, total return swaps, and cash flow swaps), other derivatives, ETFs, and other tradable and saleable items. Such derivative instruments based upon one or more SPOTS are also within the scope of the present invention.

One variation of the SPOTS allows the benchmark to change when some exogenous condition has been satisfied. Such a contract may be referred to as a SPOTS Contingent. For example, an initial benchmark might be a U.S. Treasury security but will become a General Motors Bond if some specified exogenous event (e.g., a major ratings agency downgrades General Motors to Default Status) occurs.

As mentioned, a SPOTS is structured so that its price is mathematically identical to the underlying benchmark. For example, if the price of the cash 10 Year Treasury Note is 100, the corresponding SPOTS is structured so that it should trade at a price of 100. This price parity is accomplished using the following methodology:

1) A SPOTS is structured so that there is mathematical price equivalency of the SPOTS to the underlying benchmark. Electronic exchange 100 is preferably responsible for initial pricing. A SPOTS will trade at virtually the same price as the underlying benchmark. Any deviation in price between the SPOTS and benchmark will create a riskless arbitrage opportunity, thereby keeping the pricing of SPOTS almost identical to the underlying benchmark. Investors 120 can easily track deviations in pricing through their respective connections to electronic exchange 100.

2) If the SPOTS is bought and sold the same day (day traded), the total profit/loss to the trader is the differential between the purchase and sale price.

3) If a SPOTS position is not liquidated prior to the end of the trading day, the accounts of long and short position holders are credited or debited, typically, but not always, nightly (via adjusting the price of the instrument, cash payment, accrual, or other method) the net interest income or expense (the "net carrying charge") associated with holding the equivalent position in the cash market. The "net carrying charge" is defined as the investment yield of that instrument, less the cost of financing ownership of that instrument using the generally accepted industry standard financing rate for that instrument, for a particular time period (either overnight or some other time period).

4) A SPOTS is typically defined to settle at the same price as the underlying benchmark, on a pre-specified date (or dates), or to be exchanged for the underlying benchmark on a pre-specified date (or dates).

Example for 10 Year Treasury Note SPOTS:

1. Assume that a SPOTS 10 Year Treasury Note (the benchmark based on the current "On The Run" ("OTR") 10 Year Treasury Note) is purchased at a price of 100.
2. Assume the coupon interest rate is 4.00% (per annum) on the Cash 10 Year Treasury Note (the benchmark).
3. Assume that the overnight Treasury repo rate (the generally accepted industry standard overnight financing rate) for the Cash 10 Year Treasury Note is 2.00% (per annum).
4. The net overnight carrying charge (interest earned minus the financing rate) is +2.00% (per annum) or $5.55 ($2,000/360) per day per $100,000 principal value.
5. Under this scenario, each SPOTS 10 Year Treasury Note long account would be credited $5.55 per day per $100,000 (nominal value) held overnight and each short account would be debited $5.55 per day per $100,000 held overnight.
6. This credit/debit amount is preferably calculated nightly, based on the prevailing generally accepted industry standard overnight financing rate and coupon interest rate for the cash 10 Year Treasury Note.
7. Assume the holder of the long SPOTS 10 Year Treasury Note position liquidates at a price of 100 the following day. The position would break even, based on trade execution prices, but the long would earn the net overnight carrying charge (coupon interest rate minus financing rate), and earn $5.55 per day per $100,000 face value held.
8. Conversely, the holder of the opposing short position, selling short at a price of 100 and buying (covering the short position) at a price of 100 the following day, would lose $5.55 per day per $100,000 face value sold short.

This same net carrying charge methodology is applicable to any security, commodity, derivative, index, or other tradable or saleable item. All have an implied and/or actual net carrying charge (positive or negative), regardless of whether or not they pay interest or dividends, or are actually financed.

If the nightly (or other time period) exchange of "net carrying charge" interest payments between the accounts of the long and short position holders is too cumbersome to implement, it can be eliminated. Using this methodology, the price of a SPOTS will automatically adjust (typically via arbitrage), so that the net carrying charges are included in the pricing of the SPOTS. However, using this methodology, the price of the SPOTS will now almost always differ significantly from the underlying benchmark. Those SPOTS having a positive net carrying charge (interest earned in holding benchmark is GREATER than cost of financing benchmark) would typically trade at a discount to their cash market benchmark instruments, and those having a negative net carrying charge (interest earned in holding benchmark is LESS than cost of financing benchmark) would typically trade at a premium to their cash market benchmark instruments.

Margining. A SPOTS will have price volatility almost identical to its benchmark. For most securities, commodities, derivatives, and indices, there is comprehensive pricing data going back for decades. This should make the calculation of margin requirements and risk parameters relatively easy for the brokers, clearing houses, and market participants to ascertain.

Regulatory certainty. A SPOTS is a synthetic replication of associated cash market benchmark securities, commodities, derivatives, and other tradable and saleable items, and can be structured to have no attributes of "futurity." As such, they should typically be regulated by SEC/NADSD (although there may be some exceptions). SPOTS can also be structured as futures and forwards, and options on futures and forwards. Such products would typically be regulated by the CFTC.

There are several advantages of SPOTS as compared to conventional Futures markets.

SPOTS may provide an easy way to determine "fair value." The pricing formula of SPOTS is typically mathematically identical to widely available cash benchmark prices, providing speculators, hedgers, investors, and arbitrageurs with an easy way to verify fair market value. No theoretical pricing is required.

All "basis risk" is removed. A hedger using SPOTS will have no "basis risk." SPOTS hedges have significantly less "basis risk" than existing CBOT (Chicago Board of Trade) Treasury futures or CME (Chicago Mercantile Exchange) Eurodollar bundles. For example, CBOT Treasury futures are priced off a basket of several Treasury securities. It is uncertain upon precisely which of these securities (usually the "cheapest to deliver") the CBOT contract will price. In contrast, SPOTS preferably price off a specific Treasury security (typically the "On The Run"/most actively traded security in a specific maturity range, and, at the very least, other specific Treasury securities). This allows investors and hedgers to know from the time a position is initiated, the specific security with which it will have price parity at final settlement.

SPOTS provides total return equivalency. Preferably daily (or some other predetermined time period), credit or debit for "net carrying charges" gives SPOTS a "total return" (including generally accepted industry standard daily or term financing) mathematically identical to cash market benchmarks.

SPOTS, futures based on SPOTS, and associated options can be offered by futures and securities exchanges, ATS, ECNs and/or traded Over The Counter as securities, futures, Exchange-Traded Funds (ETFs), or other derivatives.

SPOTS can be used more easily and safely to "write covered calls." SPOTS' mathematical equivalency to benchmark instruments makes "covered call writing" virtually risk free (as it relates to "basis risk"). This is different from using CBOT Treasury options on futures to "write covered calls" on cash market Treasuries, where the investors are exposed to substantial "basis risk."

There are also several advantages of SPOTS when compared to conventional Cash Markets.

SPOTS contracts provide a wide range of trading opportunities for market makers. Small to medium sized firms and individual traders are often excluded from "getting the edge" on electronic cash market trading platforms. With SPOTS, however, those small to medium sized firms will have the ability to "make markets." Small to medium size firms and individual traders are often excluded from being market makers on electronic trading platforms for bonds, foreign exchange, cash commodities, OTC derivatives, and some securities. This is not the case for SPOTS contracts, which will typically trade on commodities, securities, and other trading venues which offer equal and open access to all market participants.

The implementation and trading of SPOTS in accordance with the present invention will also create valuable price data.

As noted, SPOTS should price almost identically to cash market benchmarks, thereby providing a valuable real-time data feed. Over time, SPOTS may become the recognized pricing benchmarks, due to greater price transparency and market access.

The trading of SPOTS will also "level the playing field" for the "Buy Side." Widely disseminated price data and equal trading access removes artificial barriers, which almost always favor dealers over institutional and retail investors. Dealers often try to prevent the dissemination of timely price data, in order to maintain an information advantage over their customers. Exchanges, ECNs, and ATS typically disseminate "wholesale prices" (best bids and offers) in real time.

Furthermore, SPOTS are easier to short. Unlike the cash markets, the security or commodity does not have to be borrowed prior to shorting (recall that a SPOTS is a synthetic instrument that is merely based on a given underlying benchmark). Also, cash settlement of SPOTS prevents "short squeezes," which periodically distort cash and futures markets pricing.

Further still, SPOTS positions do not require financing arrangements by market participants. The clearing house for an exchange, ATS, or ECN or broker automatically adds or subtracts the "net carrying charge" nightly, or accrues the "net carrying charge" or, the "net carrying charge" is built into the price of SPOTS (none of these require any financing arrangements to be made by the market investors and hedgers).

Still further, SPOTS typically do not require physical delivery thereby minimizing clearing costs, and eliminating "fails" and "defaults." Again, a SPOTS is a synthetic instrument that is "merely" based on an underlying benchmark instrument's price.

Finally, a SPOTS can be structured so as to facilitate the daily payment of interest to long position holders. This is unlike the cash markets. For example, cash market Treasury securities investors must wait for the coupon (payment) date, sell their securities, or wait for a security to mature before they receive any interest payments.

Example: SPOTS Treasury

Reference Security

Coupon: 3.625%

Maturity Jan. 15, 2010

Contract Size: $1,000,000

Current Financing Rate: 1.75% (note that financing rate can change on a daily basis)

Daily Interest Earned Factor: $99.32 (0.03625/360×$1,000,000)

Minus Daily Financing Factor: ($48.61) (0.0175/360×$1,000,000)

Net Carry Factor: $50.71

The Net Carry Factor is added at the close of each business day to the accounts of open long positions and subtracted from the accounts of open short positions.

Exemplary Scenarios

Customer (i.e., investor 120) buys 1 SPOTS contract on the Treasury specified above at price of 99.25%

Scenario 1:

1) Customer sells SPOTS Treasury on same day at a price of 99.50%

2) Since customer bought and sold SPOTS contract on the same day, customer does not earn the Net Carry Factor. The customer's profit is simply $2,500 [0.25%×$1,000,000].

Scenario 2

Customer holds (but does not yet sell) a long SPOTS Treasury overnight The daily settlement price of the SPOTS Treasury is 99.00%. The value of the customer's account is:
1) Principal Value=$990,000 [99.00%×$1,000,000]
2) Net Carry Earned: $50.71
3) Total Value=$990,050.71
4) Only the net carry is earned. There is an open loss of $2,500 on the open position (not including the net carry)

Scenario 3

Customer has held the SPOTS for 3 consecutive days and then liquidates at price of 98.50%. For simplicity, we will assume that the Daily Financing Factor has remained unchanged at $48.61 so the daily Net Carry factor is still $50.71. The value of the customer's account is:
1) Loss (98.50%-99.25%)×$1,000,000=($7500)
2) Net Carry Earned: $50.71×3=$152.13
3) Total Loss to Customer=($7500)+152.13=($7347.87)

FIG. 2 is a table listing several examples of SPOTS based on U.S. Treasury Securities.

Example: Option on SPOTS 10 Year Treasury Note

Note that unlike SPOTS, options on the SPOTS contracts do not earn or pay any Net Carry.
1) An investor believes that the price of 10 Year Treasury notes will increase. They are currently trading at a price of 100 ($100,000 principal value).
2) He/she purchases a 2 week call option with a strike price of 100 on the 10 Year Treasury Note SPOTS for a price of 2.00 ($2,000 option premium value).
3) The price of the 10 Year Treasury Note increases to 110 ($110,000 principal value).
4) The investor sells the call option for a price of 10.00 ($10,000 option premium value), netting a profit of $8,000 ($10,000 less the $2,000 he/she paid for the option).

The same methodology is applicable to put options and other types of options.

FIG. 3 is a table listing several examples of options on SPOTS based on U.S. Treasury Securities.

Variation of SPOTS: SPOTS Delivery Swap (SPDS)

An SPDS is a derivative or futures contract with a unique feature. Before, at, or soon after final settlement (the last time that a derivative or future is typically traded and/or priced), the long contract holder and/or short contract holder has the option of settling the contract (a) via cash settlement [payment or receipt of cash representing the differential between the purchase (short sale) price of the contract and the final settlement price)] or, (b) via delivering or receiving delivery of the benchmark cash instrument (swapping the SPOTS derivative or futures contract for the underlying benchmark instrument).

This feature is different from presently-available derivative and futures contracts, which are all settled via cash settlement OR physical delivery of the underlying instrument, but none includes the option of both cash settlement and physical delivery, within one contract. For example, CBOT bond futures are final settled only with delivery of the actual bonds, and CME Eurodollar contracts are final settled only with cash.

Example: SPDS

Customer A buys a $100,000 SPDS Bond future (with the On The Run 30 Year Treasury as the benchmark) at a price of 95.00. At final settlement, the contract (and benchmark) are trading at a price of 100. Customer A has the option of (a) cash settling at a price of 100.00 (a profit of $5,000), or (b) receiving delivery of the actual benchmark bond (also a profit of $5,000). In the converse of that situation, a short position holder could also have the option to (a) settle in cash (a loss of $5,000), or (b) deliver the underlying benchmark bond (also a loss of $5,000).

Variation of SPOTS: SPOTS Perpetual (SPPE)

SPPE is a variation of the SPOTS contract, in which an original underlying benchmark instrument is supplanted by another, perhaps more newly-available, underlying benchmark instrument, at a specific time, as the benchmark for a particular SPPE. The main use of this methodology would be for benchmark instruments which expire after a given time frame, and/or which lose there status as benchmarks after a certain period of time and are replaced by other benchmark instruments. An example of this is U.S. Treasury Securities.

Example: SPPE

A SPOTS contract is trading based on the current On The Run (OTR) 10 Year Treasury note. On Feb. $8^{th}$, 2006, the Treasury sold a new 10 Year Treasury Note. On Feb. $8^{th}$, 2006, this new Treasury Note now becomes the new OTR 10 Year Treasury Note (it supplants the original underlying benchmark instrument). A SPPE would account for this by replacing the Old OTR Treasury security benchmark, with the New OTR Treasury security at a specific time and date (the transition time) as the benchmark for this SPPE. At the transition time, the SPOTS contract would begin to price and trade, based on the New OTR Treasury security (including market price, coupon yield, and financing rate for that specific benchmark). It is also possible to trade put, call, and other options based on SPPEs.

Variation of SPOTS: SPOTS Benchmark Change (SPBC)

SPBC is a variation of the SPOTS that is configured to trigger a change in the benchmark when some exogenous condition has been satisfied. For example, the benchmark might be a U.S. Treasury security, but is subsequently replaced by a General Motors Bond if some specified exogenous event (e.g., a major ratings agency downgrades General Motors to Default Status) occurs.

Example: SPBC

Reference Security

Coupon: 3.625%

Issuer: U.S. Treasury

Maturity Jan. 15, 2010

Alternative Security

Coupon 4.75%

Issuer: General Motors

Maturity Mar. 15, 2012

Condition for Switching from Reference Security to Alternative Security-Major ratings agency declares General Motors to be in Default Contract Size: $1,000,000

Current Financing Rate: 1.75% (note that financing rate can change on a daily basis)

Daily Interest Earned Factor: $99.32 (0.03625/360×$1,000,000)

Minus Daily Financing Factor: ($48.61) (0.0175/360×$1,000,000)

Net Carry Factor: $50.71

The Net Carry Factor is added at the close of each business day to the accounts of open long positions and subtracted from the accounts of open short positions.

Exemplary Scenarios

Customer (i.e., investor 120) buys 1 SPOTS contract on the Treasury specified above at price of 99.25%. The first three scenarios assume that the specified condition has not been met and the contract behaves as before.

Scenario 1:
1) Customer sells SPOTS Treasury on same day at a price of 99.50%
2) Since customer bought and sold SPOTS contract on the same day, customer does not earn the Net Carry Factor. The customer's profit is simply $2,500 [0.25%×$1,000,000].

Scenario 2
1) Customer holds a long SPOTS Treasury overnight The daily settlement price of the SPOTS Treasury is 99.00%. The value of the customer's account is:
2) Principal Value=$990,000 [99.00%×$1,000,000]
3) Net Carry Earned: $50.71
4) Total Value=$990,050.71
5) Only the net carry is earned. There is an open loss of $2,500 on the open position (not including the net carry)

Scenario 3
1) Customer has held the SPOTS for 3 consecutive days and then liquidates at price of 98.50%. For simplicity, we will assume that the Daily Financing Factor has remained unchanged at $48.61 so the daily Net Carry factor is still $50.71. The value of the customer's account is:
2) Loss (98.50%-99.25%)×$1,000,000=($7500)
3) Net Carry Earned: $50.71×3=$152.13
4) Total Loss to Customer=($7500)+152.13 ($7347.87)

Scenario 4
1) Customer has held the SPOTS for 3 consecutive days. General Motors then is declared to be in default. The GM bond now becomes the benchmark. The price of the GM bond is 70.
The customer liquidates at price of 70%. For simplicity, we will assume that the Daily Financing Factor has remained unchanged at $48.61 so the daily Net Carry factor is still $50.71. The value of the customer's account is:
2) Loss (70.00%-99.25%)×$1,000,000=($292,500)
3) Net Carry Earned: $50.71×3=$152.13
4) Total Loss to Customer=($292,500)+152.13=($292,347.87)

FIG. 2 is a table listing several examples of SPOTS based on U.S. Treasury Securities.

Implementation

To implement trading of SPOTS or the several variations thereof described above, and as shown in FIG. 1, a computer (e.g., electronic exchange 100) tracks and stores in database prices/yields of various instruments, and customers/investors 120 electronically monitor prices via a quotation system, and/or request quotes as to where they can buy-and sell SPOTS. The system further matches a buyer and seller, and reports such information to the market participants, brokers, and clearing house(s). SPOTS can also be traded via non electronic methods (e.g., open outcry, over the phone, etc.)

The inventors note that the Chicago Mercantile Exchange (CME) offers a product called TRAKRS (or Total Return Asset Contracts), which are quasi-futures based on Total Return Indexes. In some ways TRAKRS resemble a SPOTS contract. However, there are several key differences between the two investment vehicles.

As mentioned, a SPOTS specifies using the generally accepted industry standard financing rate for a particular benchmark (e.g., the Treasury repo rate), In contrast, TRAKRS do not specify the rate that is used. As best understood by the inventors, TRAKRS use the Fed Funds rate minus an unspecified spread. This TRAKRS methodology can easily and substantially throw off the valuation, and therefore the usefulness of the contracts, particularly for institutional users and dealers.

SPOTS also preferably use a specific "Net Carrying Charge" (yield of instrument minus generally accepted industry standard financing rate), and add or subtract this resulting value, typically daily, to the accounts of longs and shorts. TRAKRS move money daily ONLY from long to short (the Fed Funds financing rate), and do not account for the investment yield (for example the interest earned on a Treasury security) of the benchmark on a daily basis. Because SPOTS utilize "net carrying charge" (investment yield minus generally accepted industry standard financing rate), SPOTS facilitate the daily transfer of "net carrying charge", from longs to shorts OR from shorts to longs, dependent on prevailing market conditions (positive or negative net carry).

Furthermore, unlike TRAKRS, SPOTS futures contracts have equal tax treatment for all users (IRS section 1256).

Further still, SPOTS treat all customers equally in all aspects, whereas TRAKRS are designed to penalize retail customers. Specifically, margin requirements favor institutional customers and retail short position holders are denied the receipt of interest they are due under normal market conventions.

SPRINTs (Spread Instruments) and SPRINTs based on SPOTS

SPRINTS are single class instruments that are composed of a differential (price, yield-based, cash flows, or total return) between/among any 2 or more instruments (SPOTS, SPRINTs, RADs (described below), securities, commodities, derivatives, indices, or any tradable or saleable items). SPRINTs are especially well-suited for use as Credit derivatives, Mortgage derivatives, and other interest rate derivatives. SPRINTs are virtual instruments, in that there is no need to actually buy or short sell the 2 or more instruments upon which the price of the SPRINTs are based. The SPRINTs are a calculated price of a differential, and can be easily traded on any securities or commodities exchange, Electronic Communications Network, Alternative Trading System, or "Over the Counter" (private off exchange transaction).

A SPRINT can be the difference in the price (SPRINT Spread), difference in the accumulated cash flows (SRINT Swap), difference in the combined total of the price difference, plus or minus the accumulated cash flows (SPRINT Total Return Swap), be based on a contingent event (SPRINT Contingent), or yield-based (SPRINT Yield) of the 2 or more instruments. It is noted that yield-based SPRINTS may trade on the yield differential between/among various instruments, yet settle based on price differential of the underlying instruments and/or associated cash flows, such as interest or dividends earned, and financing costs.

Under current market conventions for securities, indices, derivatives, and commodities, spread transactions are typically accomplished by buying one instrument and "short selling" another instrument. In most cash market securities transactions, "short selling" requires the "short seller," or his agent, to borrow the instrument from another party in order to "short sell" it (the "short seller" is typically required to return the instrument to the counterparty from whom he/she borrowed it, on a specified date). Thus, under existing methodology, two positions are established (a long position and a short position) in order to establish one "spread position."

Example: Conventional Spread Transaction Methodology

An investor believes that the price of Treasury notes will increase more than the price of FNMA mortgages, over the next two weeks.

1) An investor buys $10,000,000 face value of a 10 Year Treasury note at a price of 100 (the cost to the investor is $10,000,000)
2) The investor borrows $10,000,000 face value FNMA 7.00% mortgage from his/her trade counterparty. The price of the Fannie Mae mortgage is 99.00. In two weeks, the investor must return the Fannie Mae mortgage back to the counterparty.
3) The investor sells the FNMA mortgage in the open market for $9,900,000.
4) In two weeks, the price of the Treasury note has risen to 101 and the price of the Fannie Mae mortgage has remained the same.
5) The investor sells the Treasury note at a price of 101 and receives $10,100,000 from the sale (a profit of $100,000).
6) The investor buys back the Fannie Mae security at a price) of $9,900,000, thereby covering the "short position." (a break even transaction)
7) The investor returns the Fannie Mae security to the counterparty.
8) The investor's net profit on the spread transaction is $100,000.

In securities markets, in particular, these spread positions can be very difficult to establish, and/or maintain, and/or liquidate, for the following reasons:
1) An investor may not find a counterparty willing to lend the security required for the short sale
2) One or more securities in the spread transaction may be illiquid.
3) Short positions in cash market securities subject the "short seller" to "short squeezes." In a classic squeeze, the "short seller" is unable to obtain the instrument at a reasonable market price and may have to pay prohibitive penalties to the borrower. In the example above, the investor may not be able to "short sell" the Fannie Mae security because no one is willing to lend it to him at the fair market interest rate and/or price.
4) The lender of the security may demand return of the security before borrower ("short seller") wants to return it.

SPRINTs, in accordance with the present invention, overcome the drawbacks of the conventional spread transactions enumerated above.

Since a SPRINT is a single instrument that is based only on the differential between/among 2 or more instruments, there is no need to buy or borrow and "short sell" the actual underlying instruments.

Also, a trade can easily be made in a SPRINT, even if one or more of the instruments whose prices are used to calculate the SPRINT are illiquid and/or unavailable to be borrowed.

Finally, under most circumstances, a SPRINT can be "cash settled" (i.e., the value of the differential between/among the instruments is calculated, and the market participants are paid profits, or pay losses in cash). Therefore, there is no need to acquire or borrow and "short sell" the underlying instruments, thus minimizing or eliminating "short squeezes."

Example: SPRINT Spread

An investor believes that the price of Treasury notes will increase more rapidly than the price of Fannie Mae mortgages over the next two weeks.
1) The investor buys $10 Million (face value) of a 10 Year Treasury-Fannie Mae 7.00% SPRINT at a price spread of 1.00 (the SPRINT price reflects the price of the Treasury (100) minus the price of the FNMA 7.00% (99). This SPRINT may be based on the cash market benchmarks, or SPOTS (as previously described herein), futures, derivatives, or other instruments based on these benchmarks.
2) At the end of two weeks, the SPRINT price has widened to 2.00 (the price of the Treasury has increased to 101 and the price of the Fannie Mae 7.00% remains at 99)
3) The investor now sells the SPRINT at a price differential 2.00 and makes a profit of $100,000 [(0.02-0.01)×$10 Million].

Example: Option on SPRINT Spread

An investor believes that the price of Treasury notes will increase relative to the price of FNMA mortgages, over the next two weeks.
1) He/she purchase a 2 week call option with a strike price of 1.00 on the 10 Year Treasury note-Fannie Mae 7.00% mortgage SPRINT outlined above for $25,000 (0.0025× $10 Million).
2) The price of the 10 Year Treasury Note increases to 101, while the price of the Fannie Mae 7.00% remains at 99, giving the underlying SPRINT a value of 2.00.
3) The investor sells his call option for a price of 1.00, netting a profit of $75,000 ($100,000 less the $25,000 he/she paid for the option).
4) The same methodology is applicable to put options and other types of options.

Example: SPRINT Yield

An investor believes that the yield spread between a Treasury note and a corporate security will be higher in two weeks.
1) The investor buys $10 Million (face value) of a 10 Year Treasury-Ford Motor 10 Year SPRINT at a yield spread of 150 basis points (1.50%) The yield on the Treasury is 5% and the yield on the Ford Motor security is 6.5%
2) The profit on a yield based SPRINT depends on:
   a. The yield of the two securities
   b. A price/yield conversion factor that can be:
      i. Specified prior to the start of the trade
      ii. Determined by a formula that is specified at the start of the trade but whose parameters are known only when the trade is closed. A typical measure is the industry standard Price Value of 1 basis point (PVBP) of one of the instruments when the deal is closed.
3) At the end of two weeks, the SPRINT price has widened to 200 basis points (the yield on the Treasury note is now at 4.9% and the yield of the Ford security is now at 6.9%)
4) Assume that a conversion factor of 500 was specified as the basis for valuing the yield differential prior to the execution of the deal. Then the profit would be 500*(200−150)=$25,000
5) Assume that it was specified that the conversion factor would be Price Value of 1 basis point (PVBP) of the 10-year Treasury when the deal is closed. Further assume that the PVBP on the closing date is $600. Then the profit would be 600*(200−150)=$30,000

SPRINT Contingent

SPRINTS can also be structured so that the payoff is contingent on some specified exogenous event. For example, the specified contingent event might be that a ratings agency declares some corporation to be in default, or the prepayments on a specified pool of mortgage securities exceeds a stated amount, or the price of gold exceed $600 for 3 consecutive business days or that control of Congress passes to a specific political party. In the SPRINT Contingent, if the contingent event does not occur, the payoff could be set to zero. In the example below, the contingent criteria might be that the prepayment speed on the mortgages has to be 50% greater than the expected prepayments over the same period last year. The contingent criteria can apply to any type of SPRINTS instrument.

Example: SPRINT Contingent

1) The investor buys $10 Million (face value) of a 10 Year Treasury-Fannie Mae 7.00% SPRINT at a price spread of 1.00 (the SPRINT price reflects the price of the Treasury (100) minus the price of the FNMA 7.00% (99). This SPRINT carries a contingent criteria that the prepayments on the FNMA 7.0% Mortgages as reported by FNMA exceed by 50% or more the prepayments reported the previous year.
2) At the end of two weeks, the SPRINT price has widened to 2.00 (the price of the Treasury has increased to 101 and the price of the Fannie Mae 7.00% remains at 99)
3) Assume that the prepayments on this collateral did not exceed the 50% contingent level. In this case, regardless of the widening of the spread, the payout to the customer is zero.
4) On the other hand, when the prepayments exceed the 50% contingent level, the payment to the customer is $100,00 [(0.02-0.01)×$10,000,000].

SPRINT Swap

A SPRINT can consist of the difference between the accumulated cash flows of any two reference securities or indices. For example, a Sprint Swap can be based on the difference in interest payments between a Treasury security and corporate bond. A Sprint Swap can be based on the principal payments over a specified period between a FNMA 7% mortgage and a FNMA 5% mortgage. A SPRINT swap can be based on the difference between the dividend payments on a stock and the interest payments on corporate bond. The SPRINT SWAP will typically have a fixed expiration date.

Example: SPRINT Swap

A three-month SPRINT SWAP is created based on the difference in principal payments between two pools of amortizing commercial loans (Pool A and Pool B). The SPRINT SWAP has an initial reference value 0 (there will be no difference in principal payments between the two pools). If the principal payments on Pool A exceed the payments on Pool B, the customer will receive the balance. If the principal payments on Pool B exceed the principal payments on Pool A, the customer must pay the difference. At the end of 1 month, Pool A has had payments of $600,000 while Pool B only had payments of $450,000. The profit on the SPRINT Swap to the customer is +$150,000. At the end of month 2, Pool B has had $800,000 in payments while Pool A has remained at $600,000. The customer now has a loss on the SPRINT Swap of $200,000.

Example: SPRINT Total Return Swap (TRS)

A SPRINT can be based on the total return (price appreciation/depreciation, interest income) between two instruments. For example, the SPRINT Total Return Swap can be based on the total return differential between any two or more instruments (e.g., a Treasury instrument vs. an equity index, or a commodity (e.g., gold) vs. a corporate bond). The payoff calculation will be the difference in total return multiplied by some price factor (e.g., $1 Million).

1) An investor buys a SPRINT TRS based on the difference in total return in U.S. dollars between the NIKKEI 225 Japanese Stock Index and the U.S. Treasury ten year note. If the total return on the U.S. ten year note is greater than the return on the Nikkei 225 (as measured in U.S. dollars), the customer will pay (i.e., lose) the difference. If the total return on the NK225 (as measured in U. S. dollars) is greater than the total return on the ten-year note, the customer will get (i.e., earn) the difference. The price factor is $1 million.
2) At the end of 3 months, the U.S. ten year has produced 1% in price appreciation, 2% in coupon income for a total return of 3%. The NK225 has produced, in U.S. dollars, a total return of 2% (zero % price appreciation+ 1% dividend yield). The customer must pay 1% on $1,000,000 or $10,000.

Put, call and other options may be structured and traded based on all the foregoing SPRINTS examples and several variants thereof, including, but not limited to, price spread, yield spread, contingent, swap and total return swap.

Implementation

In a preferred implementation for trading a SPRINT, and similarly to the SPOTS trading implementation, a computer tracks and stores in a database, prices/yields of various instruments. Customers electronically monitor prices via a quotation system, and/or request quotes as to where they can buy and sell SPRINTs. The system further matches a buyer and seller, and reports such information to the market participants, brokers, and clearing house(s).

Ratio Derivatives (RADs) and RADs based on SPOTS

RADs are financial instruments, and indices, whose price is calculated by dividing the price (and/or yield, total return, or spread differential) of any benchmark instrument or group of benchmark instruments (SPOTS, SPRINTs, security, commodity, futures contract, index, derivative, or other saleable or tradable item) by the price (and/or yield, total return, or spread differential) of any other such instrument or group of instruments (the "ratio").

The ratio (or numerator or denominator) is then typically (but not always) multiplied or divided by a "factor," in order to produce the price of an instrument or index which can be traded on a commodities exchange, securities exchange, alternative trading system, electronic communications network, or "over the counter."

The price of RADs can be calculated and disseminated via various means as reference prices, whether or not they are actually traded as instruments.

The underlying benchmark instruments need not be acquired in order to price, structure, or trade RADs. RADs may be quoted, structured, and traded as securities, commodities, futures, indices, derivatives, or any other saleable or tradable item.

Example: RADs

A RAD is created based on the price of Gold divided by the Standard and Poor's 500 Stock Index.

1) Assume the price of Gold is $400 per ounce.
2) Assume the price of the S&P 500 is 1000.
3) Assume that the multiplication factor is 100.
4) Therefore, the current price of the RAD is 400/1000× 100 or $40.
5) Investor A buys the RAD at a price of 40 and investor B "sells short" the RAD to investor A, at a price of 40.
6) Assume the price of Gold increases to $500/ounce and the price of the S&P 500 remains at 1000.
7) Therefore, the new current price of the RAD is 500/ 1000×100 or 50.
8) In this example, Investor A would earn $10 per RAD bought and investor B would lose $10 per RAD sold short.

Example: Option on RADs

An investor believes that the price of Gold will increase relative to the price of the S&P 500 stock index, over the next two weeks. As in the above example, Gold is trading at a price of $400/ounce and the S&P 500 index is trading at a price of 1000 (RAD price=400/1000×100 or $40.00).

1) He/she purchases a 2 week call option with a strike price of 40 on the Gold/S&P 500 RAD for a price of $2.00.
2) As in the example above, the price of Gold increases to $500/ounce and the price of the S&P 500 stays constant at a price of 1000. The RAD is now valued at $50.00 (500/1000×100).
3) The investor sells his/her RAD call option for a price of $10.00, netting a profit of $8.00 ($10.00 less the $2.00 paid for the call option).
4) The same methodology is applicable to put options and other types of options.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A spread financial instrument tradable between a buyer and a seller comprising:
    a tradable contract that tracks the differential between a characteristic of a first underlying instrument and a different characteristic of a second underlying instrument, wherein a clearing of the contract between the buyer and seller is through at least one of a commodities exchange, securities exchange, and an organization approved by the United States Government for clearing financial instruments, and wherein the clearing of the contract is not contingent upon a delivery of the two or more underlying instruments.
2. The spread financial instrument of claim 1, wherein the execution of a trade the spread financial instrument does not result in positions in more than one instrument.
3. The spread financial instrument of claim 1, wherein at least one of the underlying instruments differs in a characteristic that affects valuation other than geographic location.
4. The spread financial instrument of claim 1, wherein at least one of the underlying instruments is a contract whose price tracks an underlying benchmark having an identifiable price, the underlying benchmark being at least one of a security, commodity, currency, index, derivative and hypothetical instrument, and the differential is based at least in part on price.
5. The spread financial instrument of claim 1, wherein at least one of the underlying instruments is an other spread financial instrument.
6. The spread financial instrument of claim 1, further comprising a price that is determined, at least in part, by a price value of one basis point of one of the underlying instruments.
7. The spread financial instrument of claim 1, wherein each of the underlying instruments has an accumulated cash flow, the differential being based on the accumulated cash flows of the underlying instruments.
8. The spread financial instrument of claim 1, wherein each of the underlying instruments has a total return, the differential being based on the total returns of the underlying instruments.
9. The spread financial instrument of claim 1, wherein at least one of the underlying instruments is replaced by an other instrument upon the occurrence of a predetermined exogenous event.
10. The spread financial instrument of claim 1, employed as a credit derivative.
11. The spread financial instrument of claim 1, employed as a mortgage derivative.
12. The spread financial instrument of claim 1 wherein each of the underlying instruments has a price, the differential being based on a formula that includes the ratio of the prices of the underlying instruments.
13. The spread financial instrument of claim 1 wherein the characteristic of the two or more underlying instruments is based on the prices of the underlying instruments.
14. The spread financial instrument of claim 1 wherein one of the two or more underlying instruments is an equity security and an other of the two or more underlying instruments is also an equity security.
15. The spread financial instrument of claim 1 wherein one of the two or more underlying instruments is an equity security and an other of the two or more underlying instruments is an index of equity securities.
16. The spread financial instrument of claim 1 wherein one of the two or more underlying instruments is an equity security and an other of the two or more underlying instruments is a debt instrument.
17. The spread financial instrument of claim 1 wherein one of the two or more underlying instruments has a constant value.
18. An option that is based on a spread financial instrument tradable between a buyer and a seller, the spread financial instrument comprising:
    a tradable contract that tracks the differential between a characteristic of a first underlying instrument and a different characteristic of a second underlying instrument, wherein a clearing of the contract between the buyer and seller is through at least one of a commodities exchange, securities exchange, and an organization approved by the United States Government for clearing financial instruments, and wherein the clearing of the contract is not contingent upon a delivery of the two or more underlying instruments.
19. The spread financial instrument of claim 18 wherein the characteristic of any of the underlying instruments includes the prices of the underlying instruments.
20. The spread financial instrument of claim 18 that is exercisable on an occurrence of an exogenous event.
21. The option of claim 20 wherein the exogenous event includes at least one of the following: a) bankruptcy; b) credit downgrade; c) restructuring of debt; d) recall of a loan; e) acceleration of a loan; f) price of some specified financial instrument reaching a target level; g) change of political party in control; and h) change in control of party controlling either or both Houses of Congress.

22. A ratio financial instrument tradable between a buyer and a seller, comprising:
a tradable contract that is based on a ratio between a first financial instrument and a second financial instrument, wherein a clearing of the contract is not contingent upon the trading of either the first or the second financial instrument by the buyer of the contract.

23. The ratio financial instrument of claim 22, wherein at least one of the first and second financial instruments is a contract whose price tracks an underlying benchmark having an identifiable price, the underlying benchmark being at least one of a debt, equity, commodity, or currency instrument, index containing a debt, equity, currency, or commodity instrument, and derivative on a debt, equity, currency, or commodity instrument.

24. The ratio financial instrument of claim 22, wherein at least one of the first and second financial instruments is a spread financial instrument.

25. The ratio financial instrument of claim 22, wherein at least one of the first and second financial instruments is an other ratio financial instrument.

26. The ratio financial instrument of claim 22, wherein at least one of the first and second financial instruments is one of a security, commodity, derivative, or an index.

27. An option that is exercisable on the occurrence of an exogenous event and is based on a ratio financial instrument tradable between a buyer and a seller, the ratio financial instrument comprising:
a tradable contract that is based on a ratio between a characteristic of a first instrument and a second instrument, wherein a clearing of the contract is not contingent upon the trading of either the first or the second instrument by the buyer of the contract.

28. The spread financial instrument of claim 27 wherein the characteristic of the first instrument and the second instrument is based on the price of each of the first instrument and the second instrument.

29. The option of claim 27 wherein the exogenous event includes at least one of the following: a) bankruptcy; b) credit downgrade; c) restructuring of debt; d) recall of a loan; e) acceleration of a loan; f) price of some specified financial instrument reaching a target level; g) change of political party in control; and h) change in control of party controlling either or both Houses of Congress.

* * * * *